US006700720B1

(12) United States Patent
Allenspach et al.

(10) Patent No.: US 6,700,720 B1
(45) Date of Patent: Mar. 2, 2004

(54) ULTRAFAST MAGNETIZATION REVERSAL

(75) Inventors: Rolf Allenspach, Adliswil (CH); Christian Horst Back, Zurich (CH); Hans-Christof Otto Siegmann, Herrliberg (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/009,183

(22) PCT Filed: Jun. 10, 1999

(86) PCT No.: PCT/IB99/01067

§ 371 (c)(1),
(2), (4) Date: Dec. 7, 2001

(87) PCT Pub. No.: WO00/77776

PCT Pub. Date: Dec. 21, 2000

(51) Int. Cl.$^7$ ................................................. G11B 5/09
(52) U.S. Cl. ...................... 360/46; 360/124; 360/123; 360/324.1; 360/324.11; 360/324.12
(58) Field of Search ......................... 360/46, 123, 124, 360/324.11, 324.12, 324.1; 428/98, 221, 692

(56) References Cited

U.S. PATENT DOCUMENTS

| | | |
|---|---|---|
| 2,561,489 A | 7/1951 | Bloch et al. |
| 2,952,503 A | 9/1960 | Becker |
| 5,695,864 A | 12/1997 | Slonczewski |
| 5,932,310 A * | 8/1999 | Furukawa et al. ............ 428/98 |
| 6,295,186 B1 * | 9/2001 | Hasegawa et al. ..... 360/324.11 |

FOREIGN PATENT DOCUMENTS

JP          09 134551 A        5/1997

OTHER PUBLICATIONS

Siegmann H. C., "The Elementary Process of Magnetization Reversal", Jan. 1998, MMM–Intermag Conference, The 7th. Joint, p. 215.*

Weber et al., "The Ferromagnetic Spin Filter", Sep. 1999, IEEE Transactions on Magnetics, vol. 35, Issue 5, pp. 2907–2909.*

*Quelled Precession in Magneto Optic Films Using Two Step Magnetic Field for Switching*; IBM Technical Disclosure Bulletin, Nov. 1974.

Siegmann, H. C. et al.; *Magnetism with Picosecond Field Pulses*, Journal of Magnetism and Magnetic Material, Netherlands, Elsevier Science Publishers, Amsterdam, vol. 151, No. 1/02, Nov. 2, 1995, pp. L08–L12.

Heidmann, J. et al.; *Magnetic Reversal in Perpendicularly Oriented Thin Films Subjected to Picosecond Magnetic Fields*, Journal of Applied Physics, vol. 79, No. 8, Apr. 15, 1996, p. 6488.

Doyle, W. D., et al.; *Magnetization Reversal at High Speed —An Old Problem in a New Context*, J. Magn. Soc. Jpn, vol. 22, No.3, 1998, pp. 91–106.

Back, C. H. et al.; Magnetization Reversal in Ultrashort Magnetic Field Pulses, Physical Review Letters, vol. 81, No. 15, Oct. 12, 1998, pp. 3251–3254.

Silva, T. J. et al.; Inductive Measurement of Ultrafast Magnetization Dynamics in Thin–Film Permalloy, Journal of Applied Physics, vol. 85, No. 11, Jun. 1, 1999, pp. 7849–7862.

* cited by examiner

*Primary Examiner*—David Hudspeth
*Assistant Examiner*—Natalia Figueroa
(74) *Attorney, Agent, or Firm*—Robert B. Martin; Bracewell & Patterson, L.L.P.

(57) ABSTRACT

A scheme for ultrafast magnetization reversal in an in-plane magnetized layer (3) is disclosed. For that, an external magnetic field $\vec{H}_{ex}$ is applied such that the magnetization $\vec{M}$ precesses around the external magnetic field $\vec{H}_{ex}$ and the external magnetic field $\vec{H}_{ex}$ is maintained until the precession suffices to effect the magnetization reversal. The external magnetic field $\vec{H}_{ex}$ is applied approximately perpendicular to the magnetization $\vec{M}$.

14 Claims, 3 Drawing Sheets

ULTRAFAST MAGNETIZATION REVERSAL

TECHNICAL FIELD

The present invention is related to a method for ultrafast magnetization reversal with small applied magnetic fields. More particularly the invention relates to magnetic recording.

BACKGROUND OF THE INVENTION

Magnetization reversal is an elementary process underlying key technologies of our civilization such as electric transformation or magnetic recording. In conventional magnetization reversal as practiced today the reversing magnetic field is applied antiparallel to the magnetization direction. Therefore, the reversal speed is limited to a time scale which is at the nanosecond level.

Magnetic recording is an interdisciplinary field involving physics, material science, communications, and mechanical engineering. The physics of magnetic recording involves studying magnetic heads, recording media, and the process of transferring information between the heads and the medium.

Many magnetic recording systems, which are adaptable for recording and storing data, are known. Conventional systems employ a magnetizing pattern on the surface of a magnetic recording medium The magnetic medium has a magnetizing direction or a premagnetization whereby the pattern of magnetization is formed along the length of a single track, or a number of parallel tracks. The medium is in the form of a magnetic layer supported on a nonmagnetic substrate. Recording or writing takes place by causing relative motion between the medium and a recording transducer, also referred to as recording head. In general, the recording head is a ring-shaped electromagnet with a gap at the surface facing the medium. When the head is fed with a writing current representing the signal to be recorded, the fringing field from the gap magnetizes the medium, respectively. The recorded magnetization creates the above-mentioned pattern, that is in the simplest case a series of contiguous bar magnets. A "one bit" corresponds to a change in current polarity, while a "zero bit" corresponds to no change in polarity of the writing current. A moving disk is thus magnetized in the "+" direction for positive current and is magnetized in the "−" direction for negative current flow. In other words, the stored "ones" show up where reversals in magnetic direction occur on a disk and the "zeroes" reside between the "ones."

A variety of magnetic media have been used for magnetic recording over the years. However, most modern magnetic media use a thin layer of ferromagnetic material supported by a non-magnetic substrate. The magnetic layer can be formed of magnetic particles in a polymer matrix. Alternatively, the layer can be a vacuum deposited metal or oxide film The use of a thin magnetic layer permits many possible configurations for the substrate. Magnetic media are differentiated into "hard" and "soft" media. Hard media require large applied fields to become permanently magnetized. Once magnetized, large fields are required to reverse the magnetization and erase the material. Such media, with large saturation and high coercivity are appropriate for such applications as computer data storage. Soft media, on the other hand, require relatively low fields to become magnetized. These materials are more appropriate for applications such as audio recording. The choice of the media influences the way the magnetization is recorded on the medium. This is because the direction of the recorded magnetization is strongly influenced by the magnetic anisotropy of the used medium. Thus, different techniques in recording exist, for example, longitudinal recording in which the magnetization direction is directed along the length of the track or perpendicular recording whereby the medium shows perpendicular anisotropy. Media with needle shaped particles oriented longitudinally tend to have a higher remanent magnetization in the longitudinal direction, and favor therefore longitudinal recording. This longitudinal orientation can then be supported by an appropriate head design, e.g. a ring head, which promotes longitudinal fields. Longitudinal recording is today's most applied and used technique. Nevertheless, a medium can also be constructed perpendicularly to the plane of a film Such media have a higher remanent magnetization in the perpendicular direction, and favor perpendicular recording. This perpendicular orientation can be supported by a head design, e.g. a single-pole head, which promotes perpendicular fields. Perpendicular recording media are generally recognized as supporting more stable high-density recording pattern than longitudinal media.

U.S. Pat. No. 5,268,799 is related to a magnetic recording and reproducing head that records a signal into and reproduces a signal from a magnetic recording medium having a perpendicularly magnetizable Mm The magnetic recording and reproducing head includes a magnetic sensing section comprising a slender needle of a soft magnetic material, and an exciting coil wound around the slender needle for magnetizing the slender needle to record a signal on the magnetic recording medium To reproduce the recorded signal high-frequency electric energy is applied to the magnetic sensing section to produce a reflected wave, and a change in the reflected wave caused by a leakage magnetic field produced by a signal recorded on the magnetic recording medium is detected as representing the recorded signal.

C. H. Back et al. describe in their article "Magnetization Reversal in Ultrashort Magnetic Field Pulses", Physical Review Letters, Vol. 81, 3251 (1998), an experiment for studying magnetization reversal in perpendicularly magnetized Co/Pt films, whereby a short but strong magnetic field pulse is used. The applied magnetic field pulse is very strong and therefore not suitable for magnetic recording. Furthermore, a magnetic recording head is not able to generate such a strong, high energetic pulse.

Today's computers store data on magnetic disks in the form of binary digits or bits. Such a disk is rotating when the data are transmitted to the disk drive and processed in a corresponding time sequence of binary "one" and "zero" digits, or bits. Typical data rates today are about 30 MB/sec. This corresponds to magnetic-field pulses of 4 ns duration for recording. The current technologies apply antiparallel magnetic fields or magnetic-field pulses in order to reverse the magnetization direction.

Since the load of data which has to be stored increases dramatically, there is a need for faster operation in recording processes. Thus, the operating speed of the data storage systems is increasing. Today's systems show some drawbacks, e.g. the speed is physically limited, and are hence not suitable for new generations. With the conventional technology the reversal speed is in the nanosecond time scale. Therefore a much faster technology is required.

OBJECT OF THE INVENTION

It is an object of the present invention to overcome the disadvantages of the prior art.

It is another object of the present invention to provide a concept for high data rate recording.

It is still another object of the present invention to provide a method of performing ultrafast magnetization reversal.

It is a further object of the present invention to provide a method for ultrafast magnetic recording.

It is still a further object of the present invention to provide a device, a medium, and a system for ultrafast magnetic recording.

SUMMARY AND ADVANTAGES OF THE INVENTION

The objects of the invention are achieved by the features of the enclosed claims. Various modifications and improvements are contained in the dependent claims.

The underlying concept of the present invention concerns ultrafast magnetization reversal in an in-plane magnetized layer having a magnetization For achieving ultrafast magnetization reversal a small and short external magnetic field or field pulse is applied approximately perpendicular to the magnetization of the layer such that the magnetization precesses around the external magnetic field. The external magnetic field is only maintained until the precession suffices to effect the magnetization reversal, that means in the simplest case until the magnetization turns out of plane to about 20°. Then, the combination of the layer's demagnetization field and anisotropy field completes the reversal process, and turns the magnetization in the opposite direction. The magnetization turns into the opposite direction without the external magnetic field. Furthermore, the external magnetic field can be maintained, whereby the magnetization rotates around the plane for a while, and switched off such that the turn of the magnetization stops at a multiple of $\pi$, preferably in the antiparallel or opposite direction which means an odd multiple of $\pi$. The external magnetic field, on the other hand, should be short enough to avoid relaxation of the magnetization into its direction. In a uniaxial in-plane magnetized layer the magnetization shows two stable states in the plane, that is either parallel or antiparallel.

The external magnetic field is comparable to an in-plane anisotropy field of the layer and sufficient to reverse the magnetization, provided the field is applied at about a right angle to the magnetization in order to exert maximum torque on the magnetization or spins. This fact shows the advantage that a small magnetic field is enough to induce magnetization reversal whereby less energy for the creation of said magnetic field is sufficient.

It is an advantage of the present invention that a much faster magnetization reversal can be achieved since it seems that no fundamental limit exists for the time of reversal. This ultrafast magnetization reversal, for instance, can be utilized for magnetic recording. High data rate recording, much faster than 30 MB/sec, becomes feasible and allows to store an increasing load of data The present invention improves conclusively the technology of data storage and can be utilized for longitudinal recording or perpendicular recording.

When the external magnetic field is applied at an angle so that a maximum torque is exerted on the magnetization, then the advantage occurs that the physical effect of the ultrafast magnetic reversal can be exploited at best. This can be achieved if the external magnetic field is applied essentially perpendicular to the magnetization.

It is also advantageous if the external magnetic field can be applied at an angle between 45° and 135° to the magnetization, because then the external magnetic field does not need to be aligned exactly.

If the applied external magnetic field is stronger than a magnetic anisotropy field of the in-plane magnetized layer, and this means in particular that the external magnetic field needs only to be slightly stronger than the magnetic anisotropy field in order to induce an ultrafast magnetic reversal process, then the advantage occurs that the ultrafast magnetic reversal process can be initiated by a relative weak external magnetic field. This field is creatable by a device or a recording head that requires not much power, i.e. the power consumption of a storage system can be held at low level. This is especially advantageous for portable computers which use a battery.

When the applied external magnetic field is ceased before the magnetization aligns in the direction of the external magnetic field, then the advantage occurs that the magnetization turns in the opposite direction according to the present invention and not in the direction of the applied external magnetic field.

It is advantageous if the applied external magnetic field has a small field amplitude. Since the external magnetic field is only used to lift the magnetization out of the plane and the perpendicular component of the magnetization gives rise to a demagnetization field, a subsequent damped precession around the layer's demagnetization field and anisotropy field completes then the reversal process. In fact it is the demagnetization field which makes that the external magnetic field necessary for magnetization reversal is so small. Thus, already less power is sufficient to create such an external magnetic field and further the adjacent ranges on a storage medium are not disrupted or influenced by the external magnetic field. For a Co film, as shown in experiments and described below, a field amplitude of <185 kA/m at a pulse length of 2 ps (half width at half amplitude) is sufficient.

When the external magnetic field is applied at the picosecond time scale, e.g. between 1 ps and 1000 ps, then the advantage occurs that the recording process can be ultrafast whereby best magnetization-reversal results can be achieved. Therefore, much more data or a much larger load of data can be recorded and stored. An appropriately designed magnetic-field generator, e.g. as part of a recording head, that is able to generate such short magnetic fields or pulses should be used.

The magnetization of a uniaxial in-plane magnetized layer has two stable states; either the magnetization is directed in one direction, i.e. parallel, or in the opposite direction, i.e. antiparallel, in the plane. Therefore, the rotation of the magnetization stops at a multiple of $\pi$ or in one of the two directions of the plane after the external magnetic field is ceased.

When the precession of the magnetization around the layer's demagnetization field and anisotropy field completes the magnetization reversal, then the advantage occurs that the external magnetic field can be ceased before the entire magnetization reversal process is finished. This helps to save energy and increases the recording speed because the recording head can be moved already to its next position after a magnetization reversal is induced.

The external magnetic field can be applied in the plane of the layer or perpendicular to the plane. This brings the advantage that the external magnetic field is useable from various directions. Another advantage is that conventional recording heads could be used at an angle of about 90°, provided that the recording heads are designed such that these are able to create a short magnetic field or field pulse for inducing ultrafast magnetization reversal.

It is advantageous if the in-plane magnetized layer comprises nanoparticles, e.g. crystal grains, preferably identical grains, or single-domain particles, and has a demagnetization factor close to 1, because then the magnetic field required to reverse the magnetization direction can be decreased. Since every magnetic material shows a damping constant α, the material for the layer should be selected such that it shows a low damping constant α. Furthermore, the damping constant a and therefore the magnetic material for the layer can be adapted accordingly to achieve ultrafast magnetization reversal with best results. In general, it is the combination of material parameters, depending on the magnetization, the magnetic anisotropy field, the damping constant, and an external-field value at a given pulse duration which determine the efficient functioning of the reversal process.

In principle, today's storage disk materials are suited for ultrafast magnetization reversal, but improvements in material science will provide more suited materials for ultrafast magnetization reversal.

An in-plane magnetized medium or layer can be part of a flexible disk, a hard disk, a tape, or any other device capable to reverse its magnetization for recording and storing data.

Glossary

The following are informal definitions to aid in the understanding of the description.

$\vec{M}$—magnetization, which indicates the alignment of spins
$M_s$—saturation magnetization; e.g. for Co at room temperature $M_S=1.7$ T
$\vec{H}_{ex}$—external magnetic field
$\vec{H}_A$—magnetic anisotropy field
$\vec{H}_D$—demagnetizing field
α—damping constant
∂—angle between $\vec{M}$ and $\vec{H}$
Θ—angle between $\vec{M}$ and the plane of a layer
$\mu_0$—permeability of vacuum

DESCRIPTION OF THE DRAWINGS

The invention is described in detail below with reference to the following schematic drawings.

Figure 1:
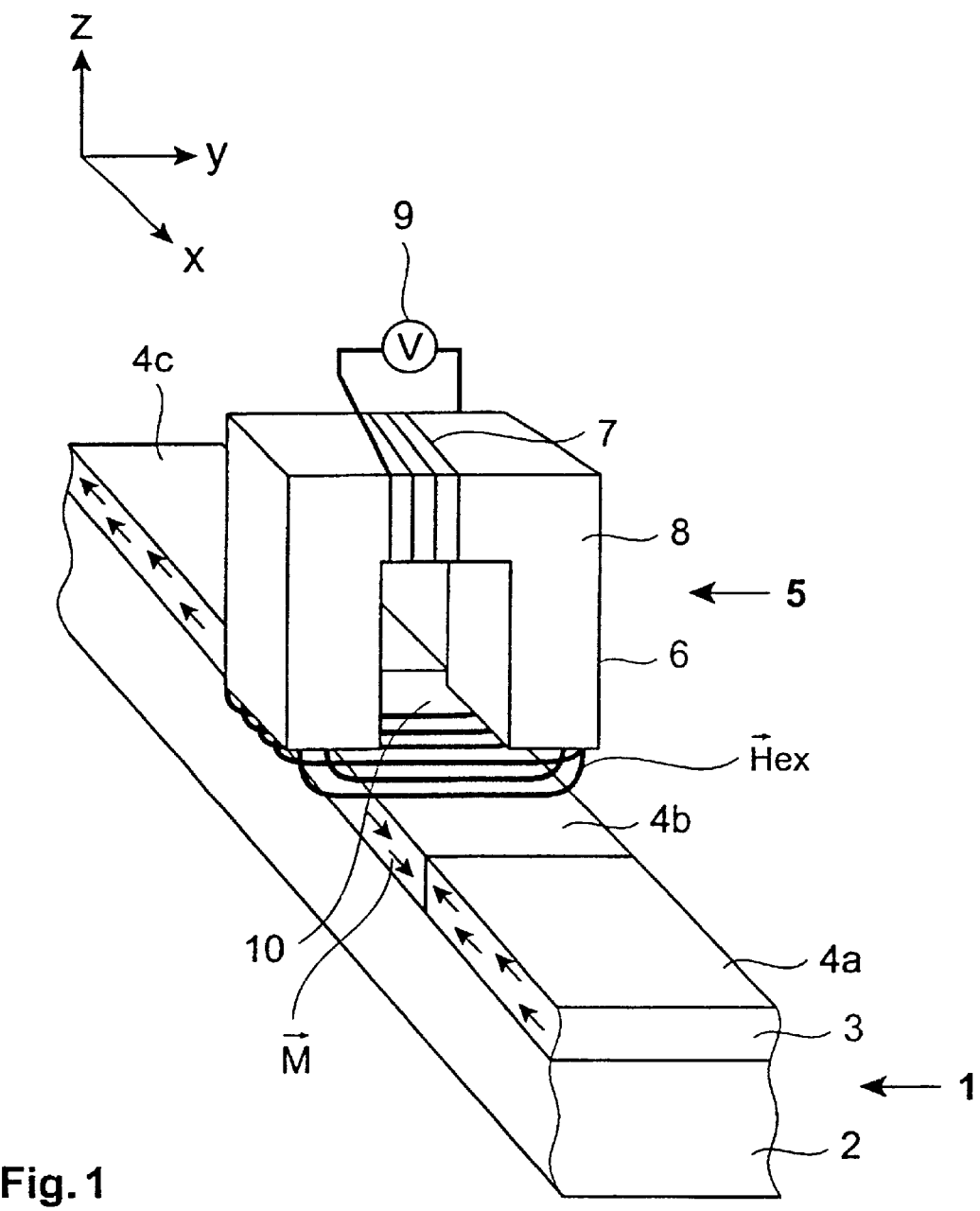
FIG. 1 shows a three-dimensional illustration of an arrangement according to the present invention.

All the figures are for the sake of clarity not shown in real dimensions, nor are the relations between the dimensions shown in a realistic scale.

DETAILED DESCRIPTION OF THE INVENTION

With general reference to the figures and with special reference to FIG. 1 the essential structure of a system for ultrafast magnetic recording according to the invention is described in more detail below.

At first, some basics, in accordance with the present invention, are addressed. In conventional magnetization reversal as practiced today the reversing field is applied antiparallel to the direction of a magnetization $\vec{M}$. The corresponding reversal speed is in the nanosecond time scale. If an external magnetic field $\vec{H}_{ex}$ inducing the magnetization reversal is applied about perpendicular to the magnetization $\vec{M}$ then according to the invention much shorter reversal times are achievable. In a magnetic layer or film, a demagnetizing field $\vec{H}_D$ helps the externally applied magnetic field $\vec{H}_{ex}$ to induce magnetization reversal. Therefore, a weak magnetic field $\vec{H}_{ex}$, also referred to as magnetic-field pulse $\vec{H}_{ex}$, is sufficient to reverse the magnetization $\vec{M}$ in an in-plane magnetized layer or film When a short magnetic field pulse $\vec{H}_{ex}$ provokes the precession of the magnetization $\vec{M}$ out of the plane of the layer, the demagnetizing field $\vec{H}_D$ is induced that points normal to the surface of the layer. When the external magnetic field pulse $\vec{H}_{ex}$ is terminated, the demagnetizing field $\vec{H}_D$ and a magnetic anisotropy field $\vec{H}_A$ persist and the precession of the magnetization $\vec{M}$ around the superposition of the demagnetizing field $\vec{H}_D$ and the magnetic anisotropy field $\vec{H}_A$ completes the magnetization reversal process. In this geometry, magnetization reversal is induced with magnetic field pulses $\vec{H}_{ex}$ of a few picoseconds' duration, but with small field amplitudes which are comparable to the magnetic anisotropy field $\vec{H}$. These field amplitudes are well within reach of conventional thin-film recording heads.

A magnetic layer used to demonstrate the magnetic reversal process has been made of Co with a thickness of 20 nm. Two types of Co layers are used, both of which exhibit a uniaxial anisotropy in the plane of the layer. One Co layer, hereinafter referred to as Co I, was grown by sputter deposition at 40° C. onto a 10 nm Pt buffer deposited at 40° C., which was grown in turn on a 5 nm Pt/0.5 nm Fe-buffer deposited at 500° C. onto a MgO(110) substrate. The other Co layer, hereinafter referred to as Co II, has been produced by electron-beam evaporation onto a 30-nm Cr buffer layer at 300° C., also on a MgO(110) substrate. The saturation magnetization for Co at room temperature is $M_S=1.7$ T. The strength of the uniaxial anisotropy field $\vec{H}_A$ in the plane of the layer was determined using the magneto-optic Kerr effect. The values are 168 and 160 kA/m for Co I and Co II, respectively.

The samples, that means Co I layer and Co II layer, were exposed to an external magnetic field $\vec{H}_{ex}$ of 2, 3, and 4.4 ps lengths (half width at half maximum of the Gaussian shape) by use of an electron bunch Afterwards, it was determined that a first magnetization reversal corresponds to a magnetic field $\vec{H}_{ex}$ of about 184 kA/M Towards larger magnetic fields, multiple reversals occur, e.g. at 224, 264, and 352 kA/m. The magnetization reversal works best if approximately $\vec{H}_{ex} \perp \vec{M}$, i.e. with an angle between 800 and 1000, and therefore the torque $\vec{T} = \vec{H}_{ex} \times \vec{M}$ is near maximum No fundamental limit seems to exist for the time of ultrafast magnetization reversal.

In conventional magnetization reversal the torque is equal to zero. In this case, the angular momentum induced by the reversal process must be absorbed by the phonon lattice, a process that is governed by the rate of energy exchange between the lattice and the magnetic system. Thus, the spin lattice relaxation time is the relevant time scale for conventional magnetization reversal.

A calculation for the ultrafast magnetization reversal can be performed using the Landau-Lifshitz equation for each individual particle, $$\frac{d\vec{M}}{dt} = -|\gamma|(\vec{M} \times \vec{H}_{tot}) + \frac{a}{M}\left(\vec{M} \times \frac{d\vec{M}}{dt}\right).$$

The Landau-Lifshitz equation assumes precession of the magnetization $\vec{M}$ around the direction of the sum of internal and external magnetic fields:

$$\vec{H}_{tot} = \vec{H}_{ex} + \vec{H}_D + \vec{H}_A,$$

with $\gamma$ being the gyromagnetic ratio with $\gamma = 0.2212 \times 10^6$ m/As, and relaxation of the magnetization $\vec{M}$ into the field direction described by the damping constant $\alpha$. The damping constant $\alpha$ should be small that means that appropriated materials for the layer should be designed and used, in order to achieve best results for the magnetization reversal process.

From the physical point of view, the phenomenon of ultrafast magnetization reversal can be explained in a three-step model.

During a magnetic field pulse $\vec{H}_{ex}$, the magnetization $\vec{M}$ precesses around the magnetic field $\vec{H}_{ex}$ out of the plane of a layer or film. As the magnetization $\vec{M}$ leaves the plane of the layer the effective demagnetizing field $\vec{H}_D$ increases, since an angle $\theta$ between $\vec{M}$ and the plane of the layer increases: $\vec{H}_D = (M_s/\mu_0) \sin \theta$. When the magnetic field $\vec{H}_{ex}$ ceases to exist, the magnetization $\vec{M}$ continues to process, but now around $\vec{H}_D + \vec{H}_A$. The maximum angle $\theta$ assumed by the magnetization $\vec{M}$ decides whether the magnetization $\vec{M}$ reverses and whether even multiple reversals can occur. Then, the magnetization $\vec{M}$ relaxes into one of the two easy magnetization directions or states. This final step can be slow.

FIG. 1 shows a three-dimensional illustration of an arrangement for magnetic recording using ultrafast magnetization reversal. FIG. 1 depicts a cuboid-shaped part of a disk 1, that here is a hard disk 1 for recording and storing data. This disk 1 comprises a substrate 2 and an in-plane magnetized layer 3 or hereinafter short layer 3 deposited thereon. The layer 3 comprises three regions, which for the sake of simplification are named according to the observer's view, a front region 4a, a middle region 4b, and a rear region 4c. Each region 4a, 4b, and 4c has its magnetization $\vec{M}$, whereby the magnetization $\vec{M}$ of the front region 4a and the rear region 4c is directed in the same direction whereas the magnetization $\vec{M}$ of the middle region 4b is directed in the opposite direction.

Over the disk 1 with a little distance and in particular across the middle region 4b a magnetic-recording head 5 is arranged. This magnetic-recording head 5 comprises a magnetic-field generator 6 that is indicated by a coil 7, a body 8, and a power supply 9. The magnetic-field generator 6 is here a ring head in which the magnetic field $\vec{H}_{ex}$ is the leakage field from a gap 10. Any other type of magnetic-field generator or head, e.g. a single-pole head, can be used instead, whereby variations of the arrangement are possible. The magnetic-field generator 6 is capable to create short magnetic fields $\vec{H}_{ex}$ or magnetic field pulses $\vec{H}_{ex}$ in y-direction in order to induce magnetization reversal in layer 3 as described theoretically above. The magnetic field pulses $\vec{H}_{ex}$ are in the picosecond timescale, preferably between 1 and 1000 ps and slightly stronger than the strength of the layer's 3 magnetic anisotropy field $\vec{H}_A$.

As can be seen in FIG. 1, an external magnetic field $\vec{H}_{ex}$ has been created by the magnetic-field generator 6 that travels through the middle region 4b of disk 1. Thereby, the external magnetic field $\vec{H}_{ex}$ is applied in the plane perpendicular to the magnetization $\vec{M}$ of layer 3. After the magnetization reversal in the middle region 4b is initiated or fulfilled, the magnetic-recording head 5 can be moved across the disk 1 to the next recording position. The magnetization reversal is shown in more detail with reference to the following figures.

Figure 2:
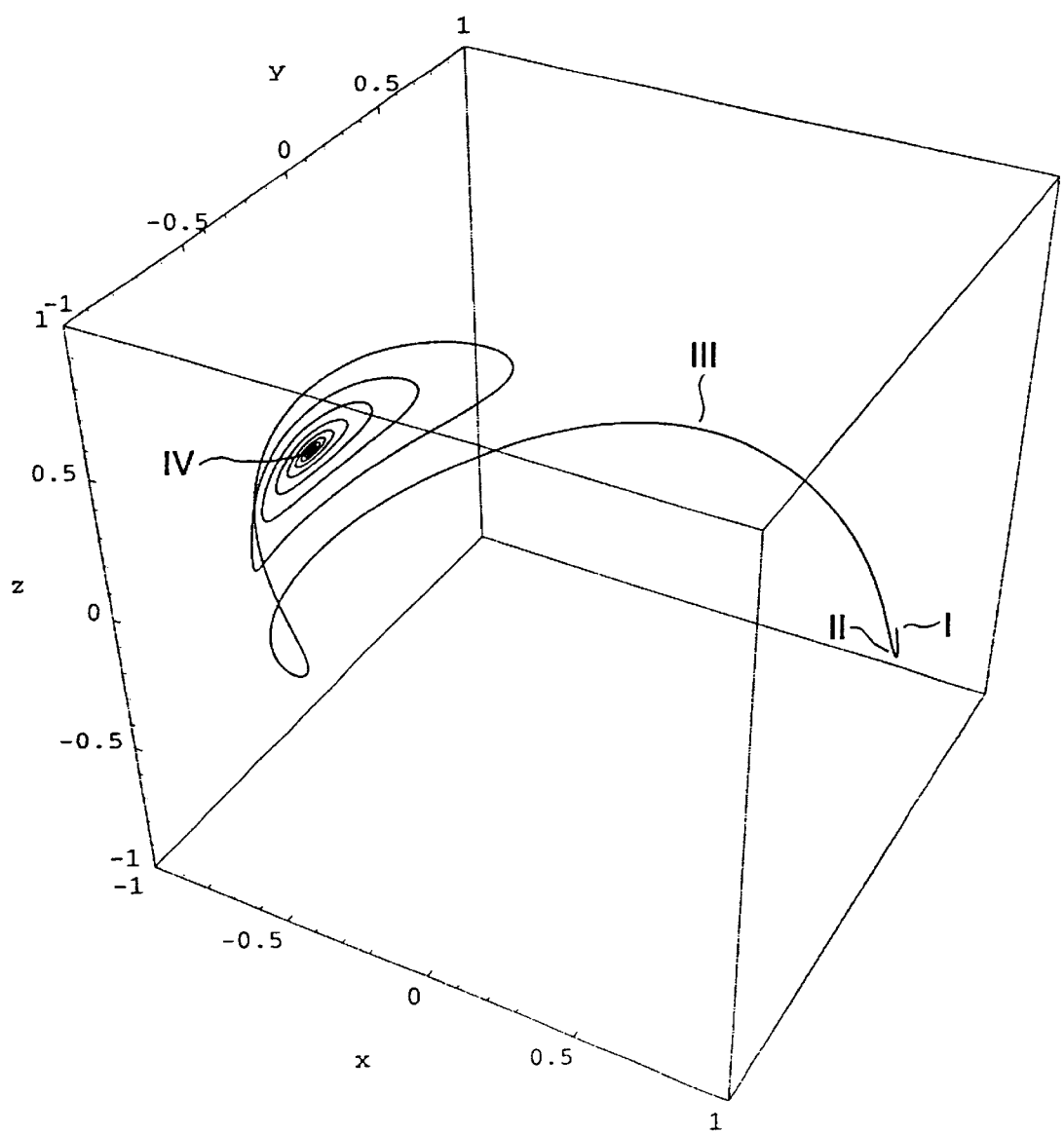
FIG. 2 shows a three-dimensional graph of a magnetization reversal according to the present invention.

FIG. 2 shows a three-dimensional illustration of a reversal of the magnetization $\vec{M}$, e.g. as indicated in FIG. 1 within the middle portion 4b. Thereby the align-movement of a single spin is considered at various positions I to IV. The movement is depicted as a graph in a three-dimensional coordination system comprising an x-axis, a y-axis, and a z-axis. For the sake of understanding and simplification the graph describes the motion of the magnetization vector during the reversal process where the origin of the magnetization vector is positioned at the origin of coordinates at x=0, y=0, and z=0.

Before an external magnetic field $\vec{H}_{ex}$ is applied, the magnetization $\vec{M}$ is aligned within the positive x-direction which is one of its two stable states. This alignment can be described by the coordinates x=1, y=0, and z=0, whereby hereafter the coordinates of the tip of the magnetization vector are denoted as [1,0,0] for simplification reasons. The course of the single components x, y, z is shown versus time in FIG. 3, FIG. 4, and FIG. 5, respectively. Positions I to IV, indicated at the graph and depicted in FIG. 2, correspond to those positions I to IV depicted in the FIGS. 3 to 5.

An external magnetic field $\vec{H}_{ex}$ creatable by the magnetic-field generator 6 as shown in FIG. 1, is applied according to the invention about perpendicular to the magnetization $\vec{M}$. This means here that the external magnetic field $\vec{H}_{ex}$ is applied in y-direction. The external magnetic field $\vec{H}_{ex}$ provokes the precession of the magnetization $\vec{M}$ out of the plane x. Starting at position I and [1,0,0] in FIG. 2, the graph shows a slight move simultaneously in the positive y-direction, depicted in more detail in FIG. 5, and in the negative z-direction, depicted in more detail in FIG. 3, to position II. Position II is reached after approximately 2–4 ps. At this point in time, the external magnetic field $\vec{H}_{ex}$ is ceased or terminated. No further energy or external magnetic field $\vec{H}_{ex}$ needs to be applied since a demagnetizing field $\vec{H}_D$ and a magnetic anisotropy field $\vec{H}_A$ persist and the precession of the magnetization $\vec{M}$ by the influence of the demagnetizing field $\vec{H}_D$ and the magnetic anisotropy field $\vec{H}_A$ completes the magnetization reversal process, as described above. Thereby the graph runs through position III, where afterwards the direction of the magnetization $\vec{M}$ has changed to the negative x-direction, runs through a loop, and comes finally to position IV having the coordinates [−1,0,0] where the magnetization reversal process is complete. After the mentioned loop, the graph describes a spiral-like movement before the finally position IV is reached. Position IV indicates the second stable state and here the reversal position.

In the case that the external magnetic field $\vec{H}_{ex}$ is maintained, a rotation of the magnetization $\vec{M}$ around the external magnetic field $\vec{H}_{ex}$ which here means around the y-direction can be observed. Large rotation angles of the magnetization $\vec{M}$ can also be achieved by use of a strong external magnetic field $\vec{H}_{ex}$. In view of a successful reversal, the rotation of the magnetization $\vec{M}$ stops at an odd multiple of π. In general, several turns of the magnetization $\vec{M}$ are possible depending on the properties of the used material, in particular its damping constant α, the strength and the duration of the external magnetic field $\vec{H}_{ex}$, before the magnetization $\vec{M}$ lines up in the direction of the magnetic field $\vec{H}_{ex}$ if this is maintained for a longer time period. Therefore, the ultrafast magnetization reversal process can be adapted accordingly.

Figure 3:
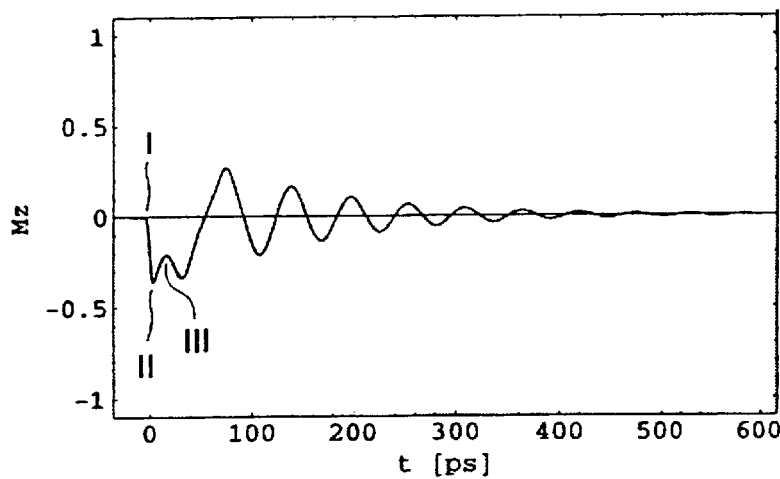
FIG. 3 shows the z-component of FIG. 2 in more detail.

FIG. 3 shows the z-component of FIG. 2, labeled here by Mz, in more detail. The depicted positions I to III correspond to the positions in FIG. 2. The graph in FIG. 3 is depicted over a time axis t and describes a building-up transient oscillation which after approximately 500 ns turns back to zero. As mentioned above, position I is the starting position. At position II, the external magnetic field $\vec{H}_{ex}$ is ceased whereby this short field-utilization is sufficient for inducing the magnetization reversal process. Position III indicates the magnetization reversal before the graph describes the spiral-like movement as shown in FIG. 2.

Figure 4:
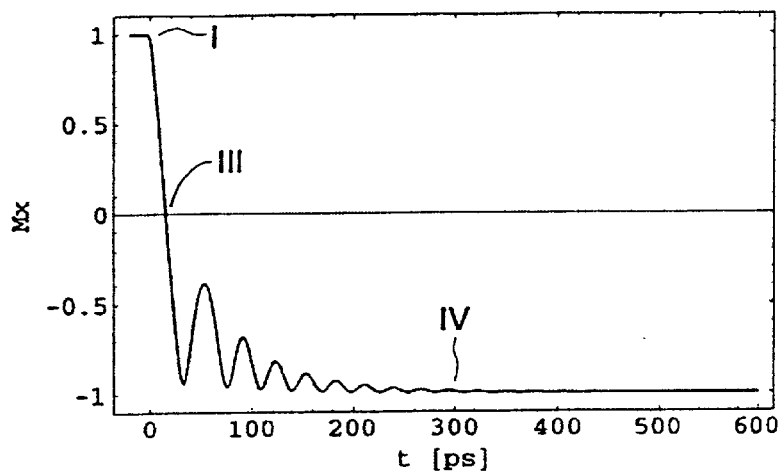
FIG. 4 shows the x-component of FIG. 2 in more detail.

FIG. 4 shows the x-component of FIG. 2, labeled by Mx, in more detail. The depicted positions I, III, and IV correspond to those positions indicated in FIG. 2. The graph in FIG. 4 is depicted over the same time axis t as in FIG. 3 and describes the magnetization reversal from position I which indicates a positive x-direction to position IV which, on the other hand, indicates a negative x-direction, whereby after passing the zero line at position III the graph oscillates until it reaches position IV at approximately 300 ps.

Figure 5:
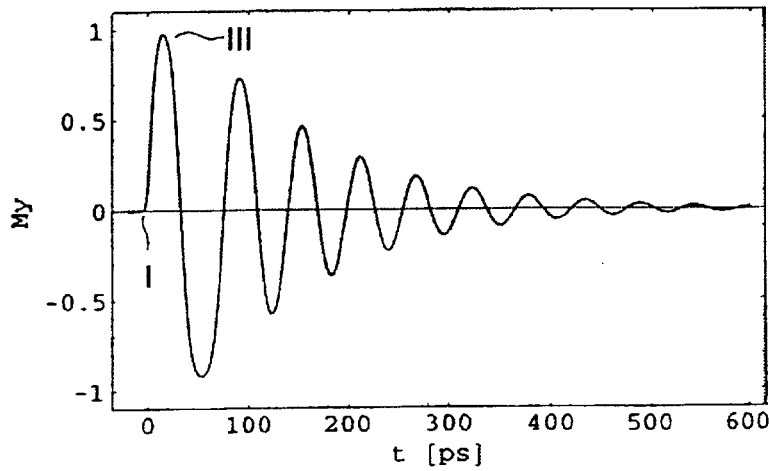
FIG. 5 shows the y-component of FIG. 2 in more detail.

FIG. 5 shows the y-component of FIG. 2, labeled by My, in more detail. The depicted positions I and III correspond to the positions in FIG. 2. The graph in FIG. 5 is depicted over the same time axis t as in FIG. 3 and 4 and shows a classical building-up transient oscillation. The graph starts at position I, runs through position m which indicates the highest positive amplitude and further through a highest negative amplitude before the curve oscillates back to zero.

As can be read from the FIGS. 3 to 5, the magnetization reversal is finally complete after approximately 500 ps whereas the magnetization reversal process is initiated within approximately 2–4 ps.

As indicated above, several turns of the magnetization $\vec{M}$ are possible depending on material properties, strength and duration of the external magnetic field $\vec{H}_{ex}$. In such a case FIG. 4 would be similar to FIG. 5 where the positive and negative amplitude is alternating. A simple magnetization reversal is preferred since this is the fastest reversal.

The embodiment can be varied in that the strength of the external magnetic field $\vec{H}_{ex}$ is varied in combination with the switch-off times. Further, the material properties of the in-plane magnetized layer can be adapted in order to support ultrafast magnetization reversal.

What is claimed is:

1. A method of performing magnetization reversal in an in-plane magnetized layer with a magnetization $\vec{M}$, comprising the step of:

applying an external magnetic field $\vec{H}_{ex}$ such that said magnetization $\vec{M}$ precesses around said external magnetic field $\vec{H}_{ex}$ and said external magnetic field $\vec{H}_{ex}$ is ceased before said magnetization reversal is finished.

2. The method of claim 1, wherein the external magnetic field $\vec{H}_{ex}$ is applied at an angle with respect to the in-plane magnetized layer so that a maximum torque $\vec{T}$ is exerted on the magnetization $\vec{M}$.

3. The method of claim 1, wherein the in-plane magnetized layer as a demagnetization field $\vec{H}_D$ that causes the magnetization reversal.

4. The method of claim 1, wherein a damped precession of the magnetization $\vec{M}$ around a demagnetization field $\vec{H}_D$ and an anisotropy field $\vec{H}_A$ of the in-plane magnetized layer completes the magnetization reversal if the external magnetic field $\vec{H}_{ex}$ ceases.

5. The method of claim 1, wherein the applied external magnetic field $\vec{H}_{ex}$ is ceased before the magnetization $\vec{M}$ aligns in the direction of said external magnetic field $\vec{H}_{ex}$.

6. The method of claim 1, wherein the external magnetic field $\vec{H}_{ex}$ is applied at an angle between 45° and 135°, and approximately perpendicular to the magnetization $\vec{M}$.

7. The method of claim 1, wherein the external magnetic field $\vec{H}_{ex}$ is applied at a picosecond time scale, between 1 ps and 1000 ps.

8. The method of claim 1, wherein the magnetization $\vec{M}$ describes a rotation that stops at an odd multiple of π.

9. The method of claim 1, wherein the external magnetic field $\vec{H}_{ex}$ is applied in a plane of the in-plane magnetized layer.

10. A device for magnetization reversal on an in-plane magnetized medium with a magnetization $\vec{M}$ comprising a magnetic-field generator for applying an external magnetic field $\vec{H}_{ex}$ such that said magnetization $\vec{M}$ precesses around said external magnetic field $\vec{H}_{ex}$ and said external magnetic field $\vec{H}_{ex}$ is ceased before said magnetization reversal is finished.

11. An in-plane magnetized medium for storing data being able to reverse its magnetization $\vec{M}$ in at least a region of said medium by applying an external magnetic field $\vec{H}_{ex}$ such that said magnetization $\vec{M}$ precesses around said external magnetic field $\vec{H}_{ex}$ and said external magnetic field $\vec{H}_{ex}$ is ceased before said magnetization reversal is finished.

12. The in-plane magnetized medium according to claim 11 comprising nanoparticles, and has a demagnetization factor between 1/3 and 1, and an adapted damping constant α.

13. The in-plane magnetized medium according to claim 11 being one of a group comprising a flexible disk, a hard disk, and a tape.

14. A system for magnetic recording comprising an in-plane magnetized medium with and a magnetic recording head for applying an external magnetic field $\vec{H}_{ex}$ such that said magnetization $\vec{M}$ precesses around said external magnetic field $\vec{H}_{ex}$ and said external magnetic field $\vec{H}_{ex}$ is ceased before said magnetization reversal is finished.

* * * * *

UNITED STATES PATENT AND TRADEMARK OFFICE
CERTIFICATE OF CORRECTION

PATENT NO. : 6,700,720 B1
DATED : March 2, 2004
INVENTOR(S) : Allenspach et al.

It is certified that error appears in the above-identified patent and that said Letters Patent is hereby corrected as shown below:

Column 10,
Line 60, please add -- for storing data being able to reverse its megnetization M -- in between the words "with" and "and".

Signed and Sealed this

Twenty-second Day of March, 2005

JON W. DUDAS
*Director of the United States Patent and Trademark Office*